(12) United States Patent
Yang

(10) Patent No.: US 12,442,942 B2
(45) Date of Patent: Oct. 14, 2025

(54) LIGHT DETECTION DEVICE AND DETECTION METHOD FOR CONTROLLING LIGHT SOURCE DEVICE

(71) Applicant: InnoCare Optoelectronics Corporation, Tainan (TW)

(72) Inventor: Shih-Hsien Yang, Tainan (TW)

(73) Assignee: InnoCare Optoelectronics Corporation, Tainan (TW)

( * ) Notice: Subject to any disclaimer, the term of this patent is extended or adjusted under 35 U.S.C. 154(b) by 268 days.

(21) Appl. No.: 18/310,536

(22) Filed: May 2, 2023

(65) Prior Publication Data

US 2023/0408712 A1    Dec. 21, 2023

Related U.S. Application Data

(60) Provisional application No. 63/352,232, filed on Jun. 15, 2022.

(30) Foreign Application Priority Data

Mar. 16, 2023  (TW) ................................. 112109720

(51) Int. Cl.
G01T 1/20    (2006.01)
(52) U.S. Cl.
CPC .................................. G01T 1/2018 (2013.01)
(58) Field of Classification Search
None
See application file for complete search history.

(56) References Cited

U.S. PATENT DOCUMENTS

| 8,604,434 | B2 | 12/2013 | Kobayashi |
| 9,101,328 | B2* | 8/2015 | Tsuji ......................... H05G 1/38 |
| 9,259,201 | B2 | 2/2016 | Sato |
| 9,265,467 | B2* | 2/2016 | Kamiya ................... A61B 6/06 |
| 2002/0181648 | A1 | 12/2002 | Ruetten et al. |

FOREIGN PATENT DOCUMENTS

EP    2574279    3/2015

OTHER PUBLICATIONS

"Search Report of Europe Counterpart Application", issued on Nov. 20, 2023, p. 1-p. 8.

* cited by examiner

*Primary Examiner* — Edwin C Gunberg
(74) *Attorney, Agent, or Firm* — JCIPRNET

(57) ABSTRACT

The disclosure provides a light detection device and a detection method for controlling a light source device. The light detection device includes a detection panel and a processor. The detection panel converts an input light from the light source device into a converted light and converts the converted light into a charge. The processor selects a first region and a second region other than the first region from the detection panel. A first charge of the converted light received by at least one first pixel of the first region during a first period is used to detect a dose of the input light. A second charge of the converted light received by the second region during the first period is used to generate a data image. The charge of the converted light received by at least one first pixel during a second period is used to generate the data image.

20 Claims, 12 Drawing Sheets

LIGHT DETECTION DEVICE AND DETECTION METHOD FOR CONTROLLING LIGHT SOURCE DEVICE

CROSS-REFERENCE TO RELATED APPLICATION

This application claims the priority benefit of the U.S. provisional application Ser. No. 63/352,232, filed on Jun. 15, 2022 and the priority benefit of Taiwan application serial no. 112109720, filed on Mar. 16, 2023. The entirety of each of the above-mentioned patent applications is hereby incorporated by reference herein and made a part of this specification.

BACKGROUND

Technical Field

The disclosure relates to a light detection device and a detection method, and more particularly to a light detection device and a detection method for controlling a light source device.

Description of Related Art

Generally, a light detection device may be used to control a light source device. Furthermore, the light detection device receives the input light provided by the light source device and generates a data image based on the exposure dose of the input light.

In some applications, the exposure dose of the input light (e.g., X-ray, etc.) provided by the light source device has to be limited. Therefore, it is necessary to add an additional sensor to detect the exposure dose. However, the increase of sensor will increase the system cost and system volume.

SUMMARY

The disclosure provides a light detection device and a detection method for controlling a light source device. The light detection device may have the function of detecting an exposure dose.

The light detection device of the disclosure is used to control the light source device. The light detection device includes a detection panel and a processor. The detection panel converts an input light from the light source device into a converted light and converts the converted light into a charge. The processor is coupled to the detection panel and the light source device. The processor selects a first region and a second region other than the first region from a detection region of the detection panel according to a setting instruction. A first charge of the converted light received by at least one first pixel of the first region during a first period is used to detect a dose of the input light. A second charge of the converted light received by the second region during the first period is used to generate a data image. The charge of the converted light received by the at least one first pixel during a second period is used to generate the data image.

The detection method of the disclosure is adapted to light detection devices. The light detection device is used to control the light source device. The light detection device includes a detection panel. The detection panel converts an input light from the light source device into a converted light. The detection method is described below. A first region and a second region other than the first region are selected from a detection region of the detection panel according to a setting instruction. A dose of the input light is detected during a first period according to a first charge of the converted light received by at least one first pixel of the first region. A data image is generated during the first period according to a second charge of the converted light received by the second region. The data image is generated during a second period according to a charge of the converted light received by the at least one first pixel.

Based on the above, the light detection device selects the first region and the second region of the detection panel according to the setting instruction. During the first period, the light detection device detects the dose of the input light according to a first charge from at least one first pixel of the first region and generates a data image according to the second charge from the second region. During the second period, the light detection device generates the data image according to a charge received by the at least one first pixel. In this way, the light detection device may have the function of detecting the exposure dose.

In order to make the aforementioned features and advantages of the disclosure comprehensible, embodiments accompanied with drawings are described in detail below.

DESCRIPTION OF THE EMBODIMENTS

Figure 1:
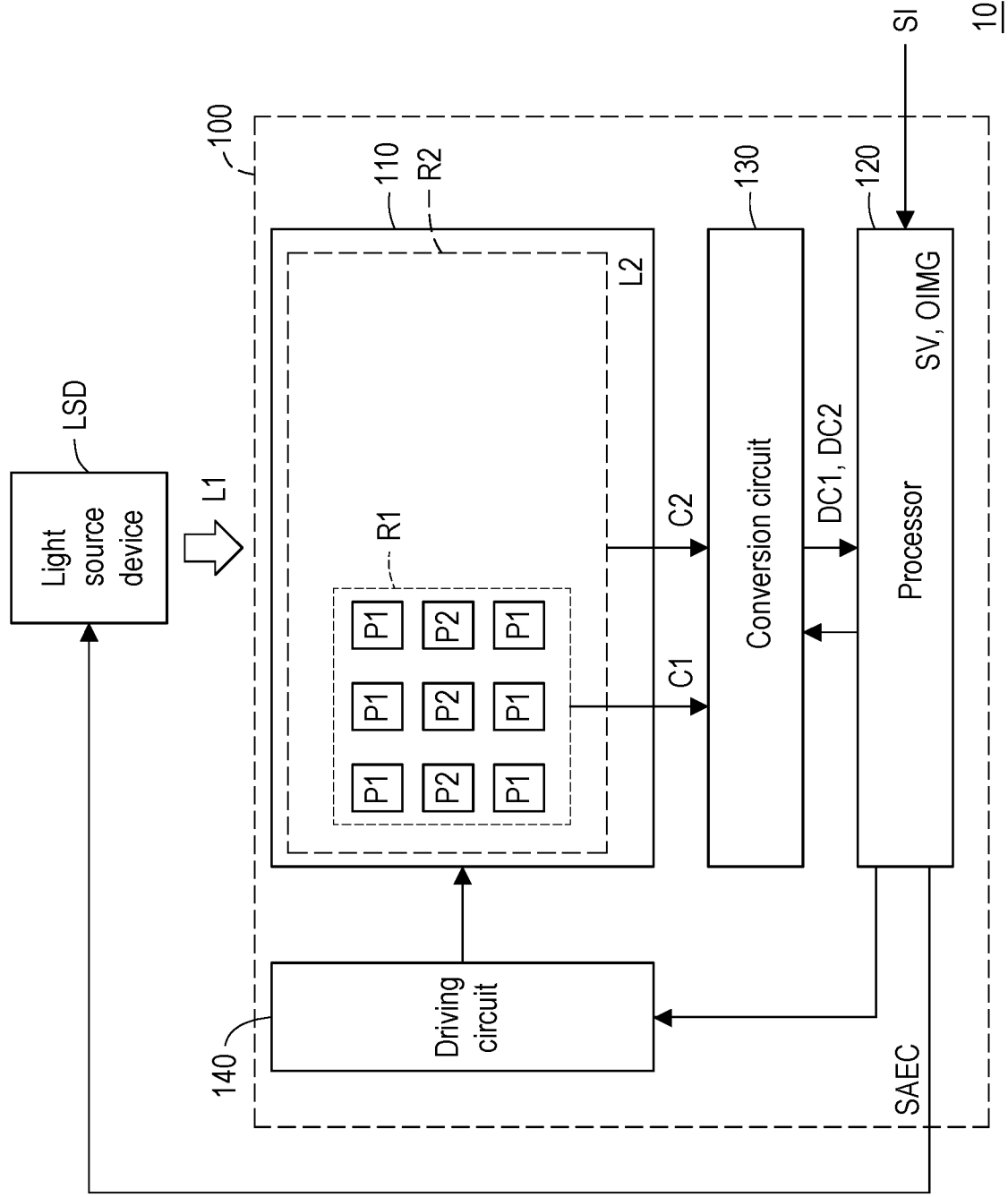
FIG. 1 is a system schematic view according to the first embodiment of the disclosure.

A portion of the embodiments of the disclosure will be described in detail with reference to the accompanying drawings. Element symbol referenced in the following description will be regarded as the same or similar element when the same element symbol appears in different drawings. These examples are only a portion of the disclosure and do not disclose all possible embodiments of the disclosure. More precisely, these embodiments are only examples within the scope of the patent application of the disclosure.

Certain terms may be used throughout the disclosure and the appended claims to refer to specific elements. It should be understood by those skilled in the art that electronic device manufacturers may refer to the same elements by different names. The disclosure does not intend to distinguish between elements that have the same function but have different names. In the following description and claims, words such as "comprising" and "including" are open-ended words, so they should be interpreted as meaning "including but not limited to . . . ".

In the disclosure, wordings used to indicate directions, such as "up," "down," "front," "back," "left," and "right," merely refer to directions in the accompanying drawings. Therefore, the directional wordings are used to illustrate rather than limit the disclosure. In the accompanying drawings, the drawings illustrate the general features of the methods, structures, and/or materials used in the particular embodiments. However, the drawings shall not be interpreted as defining or limiting the scope or nature covered by the embodiments. For example, the relative sizes, thicknesses, and locations of the layers, regions, and/or structures may be reduced or enlarged for clarity.

In some embodiments of the disclosure, terms related to joining and connecting, such as "bonded", "connected", "interconnected", etc., unless otherwise defined, may mean that two structures are in direct contact, or may also mean that two structures are not in direct contact, in which there are other structures located between these two structures. The terms related to joining and connecting can also include the case where both structures are movable, or both structures are fixed. Furthermore, the term "coupled" includes any direct or indirect means of electrical connection. In the case of a direct electrical connection, the end points of two elements on a circuit directly connect to each other, or connect to each other through a conductive wire. In the case of indirect electrical connection, a switch, a diode, a capacitor, an inductor, a resistor, other suitable elements, or a combination thereof, but not limited therein, is between the end points of two elements on a circuit.

The terms "about", "equal to", "equal" or "same", "substantially" or "generally" are interpreted as within 20% of a given value or range, or interpreted as within 10%, 5%, 3%, 2%, 1%, or 0.5% of the given value or range.

The terms such as "first", "second", etc. used in the description and the claims are used to modify elements, which do not imply and represent that the elements have any previous ordinal numbers, and also does not represent the order of a certain element and another element, or the order of the manufacturing method. The use of the ordinal numbers is to only clearly distinguish an element with a certain name from another element with the same name. The same terms may not be used in the claims and the description, and accordingly, the first component in the description may be the second component in the claims. It should be noted that, in the following embodiments, the technical features in several different embodiments can be replaced, reorganized, and mixed to complete other embodiments without departing from the spirit of the disclosure.

It should be noted that, in the following embodiments, the features in several different embodiments can be replaced, reorganized, and mixed to complete other embodiments without departing from the spirit of the disclosure. As long as the features of the various embodiments do not violate the spirit of the disclosure or conflict with one another, they can be mixed and matched arbitrarily.

Unless otherwise defined, all terms (including technical and scientific terms) used herein have the same meaning as commonly understood by one of ordinary skill in the art to which this disclosure belongs. It is understood that these terms, such as those defined in commonly used dictionaries, should be interpreted as having meanings consistent with the relevant art and the background or context of the disclosure, and should not be interpreted in an idealized or overly formal manner, unless otherwise defined in the embodiments of the disclosure.

The electronic device of the disclosure may include a light detection device or a splicing device, but not limited thereto. The electronic device (e.g., light detector) may be a bendable or flexible electronic device. In the disclosure, an electronic device (e.g., light detector) may include electronic elements, and the electronic elements may include passive elements and active elements, such as a capacitor, a resistor, an inductor, a diode, a transistor, and the like. The diode may include a light emitting diode or a photodiode. The light emitting diode may include, for example, an organic light emitting diode (OLED), a mini light emitting diode (mini LED), a micro light emitting diode (micro LED), or a quantum dot light emitting diode (quantum dot LED), but not limited thereto. Hereinafter, the detection device is used as the electronic device or the splicing device to illustrate the disclosure, but the disclosure is not limited thereto.

FIG. 1 is a system schematic view according to the first embodiment of the disclosure, and FIG. 1 shows a system 10. In this embodiment, the system 10 includes a light source device LSD and a light detection device 100. The light source device LSD is controlled to provide an input light L1. The light detection device 100 generates a data image OIMG according to the input light L1. In this embodiment, the input light L1 may be an X-ray. In some embodiments, the input light L1 may be a visible light, an infrared light, or an ultraviolet light.

In this embodiment, the light detection device 100 includes a detection panel 110 and a processor 120. The detection panel 110 converts the input light L1 from the light source device LSD into a converted light L2 and converts the converted light L2 into a charge. The processor 120 is coupled to the detection panel 110 and the light source device LSD. The processor 120 receives a setting instruction SI. The processor 120 selects a first region R1 and a second region R2 other than the first region R1 from a detection region of the detection panel 110 according to the setting instruction SI. In this embodiment, the processor 120 changes the position or range of the first region R1 according to the setting instruction SI. In this embodiment, the first region R1 includes multiple first pixels P1 and multiple second pixels P2. Thus, the amount or position of the first pixels P1 and the amount or position of the second pixels P2 are changed according to the setting instruction SI.

In this embodiment, the setting instruction SI may be setting information provided by a user through a user interface.

During the first period, a first charge C1 of the converted light L2 received by the first pixel P1 is used to detect a dose of the input light L1. Also, during the first period, a second charge C2 of the converted light L2 received by the second region R2 is used to generate the data image OIMG. In addition, during the second period, the charge of the converted light L2 received by the first pixel P1 is used to generate the data image OIMG. In other words, the charge from the first pixel P1 has different applications in different periods.

It is worth mentioning that the light detection device 100 selects the first region R1 and the second region R2 of the detection panel 110 according to the setting instruction SI. During the first period, the light detection device 100 detects the dose of the input light L1 according to the first charge C1 from the first pixel P1 and generates the data image OIMG according to the second charge C2 from the second region R2. During the second period, the light detection device 100 generates the data image OIMG according to a charge received by the first pixel P1. In this way, the light detection device 100 may have the function of detecting the exposure dose without equipping an additional sensor.

In this embodiment, the first period may be, for example, an operation period for detecting the dose of the input light L1. The second period may be, for example, an operation period in which the first region R1 does not need to detect the dose of the input light L1. In some embodiments, the second period may be, for example, an operation period for detecting the dose of the input light L1 using a new first region R1. The first region R1 in the second period is different from the first region R1 in the first period. In some embodiments, the second period may be, for example, an operation period that does not need to detect the dose of the input light L1.

In this embodiment, during the first period, the second pixel P2 in the first region R1 also provides the second charge C2 (but the disclosure is not limited thereto). Thus, the light detection device 100 may generate the data image OIMG according to the second charge C2 from the second pixel P2 and the second region R2.

In this embodiment, during the second period, the second pixel P2 in the first region R1 and the second region R2 of the first period also provide charges (but the disclosure is not limited thereto). Thus, the light detection device 100 may generate the data image OIMG according to the charges from the first region R1 and the second region R2. In addition, during the second period, a new first region R1 may be selected. Thus, during the second period, the light detection device 100 may detect the dose of the input light L1 by using the generated first pixel P1 of the first region R1. During the second period, the new first region R1 may not be selected, so that the light detection device 100 may not detect the dose of the input light L1 during second period.

This embodiment uses multiple first pixels P1 and multiple second pixels P2 as an example. The amount of the first pixels P1 and the amount of the second pixels P2 may be one or more according to the setting instruction SI. This disclosure is not limited to the amount of the first pixels P1 and the amount of the second pixels P2.

In this embodiment, the processor 120 is, for example, a central processing unit (CPU), or a programmable microprocessor of common usage or specific usage, a digital signal processor (DSP), programmable controller, an application specific integrated circuits (ASIC), a programmable logic device (PLD), or other similar apparatus or the combinations thereof, which may load and execute computer programs.

In this embodiment, the light detection device 100 further includes a conversion circuit 130. The conversion circuit 130 is coupled to the processor 120 and the detection panel 110. The conversion circuit 130 converts the first charge C1 from the first pixel P1 to first charge data DC1 during the first period and converts the second charge C2 from the second region R2 to second charge data DC2. Thus, during the first period, the processor 120 detects the dose of the input light L1 according to the first charge data DC1 and generates the data image OIMG according to the second charge data DC2. During the second period, the processor 120 at least generates the data image OIMG according to the charge data corresponding to the first pixel P1.

In this embodiment, the conversion circuit 130 may be an analog-to-digital conversion circuit with a charge readout function.

Figure 2:
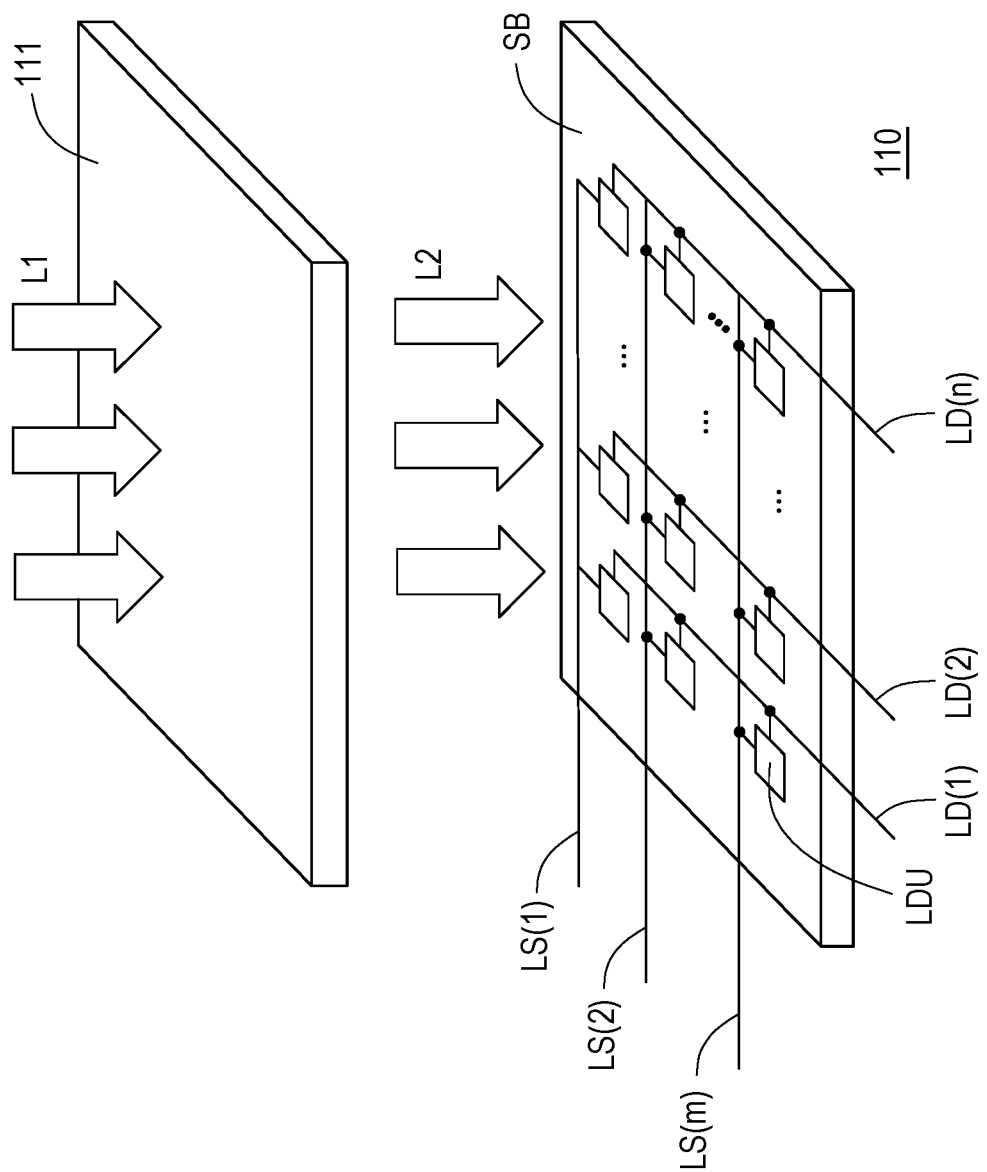
FIG. 2 is a schematic view of a detection panel according to an embodiment of the disclosure.

FIG. 2 is a schematic view of a detection panel according to an embodiment of the disclosure. Referring to FIG. 1 and FIG. 2 together, in this embodiment, the light detection device 100 further includes a driving circuit 140. The driving circuit 140 is coupled to the processor 120 and the detection panel 110. The detection panel 110 includes a light conversion element 111, a substrate SB, multiple light detectors LDU, scan lines LS(1)~LS(m), and data lines LD(1~LD(n). The light conversion element 111 converts the input light L1 from the light source device LSD into the converted light L2. Taking this embodiment as an example, the converted light L2 may be a visible light. The light conversion element 111 may be implemented by a scintillator.

In this embodiment, the light detectors LDU, the scan lines LS(1)~LS(m), and the data lines LD(1)~LD(n) are disposed on the substrate SB. The light detectors LDU are connected to the scan lines LS(1)~LS(m) and the data lines LD(1)~LD(n), respectively. The conversion circuit 130 is coupled to the data lines LD(1)~LD(n). The driving circuit 140 is coupled to the processor 120 and the scan lines LS(1)~LS(m). The processor 120 controls the conversion circuit 130 and the driving circuit 140 to select the first region R1 and the second region R2.

In this embodiment, the driving circuit 140 may be implemented by a gate driving circuit or a shift register.

The first region R1 includes a first light detector among the of light detectors LDU. The driving circuit 140 determines at least one first scan line corresponding to the first region R1 according to the first region R1. The conversion circuit 130 determines at least one first data line corresponding to the first region R1 according to the first region R1.

Further, the processor 120 controls the conversion circuit 130 and the driving circuit 140 to use the first light detector as one of the first pixel P1 and the second pixel P2.

Figure 3:
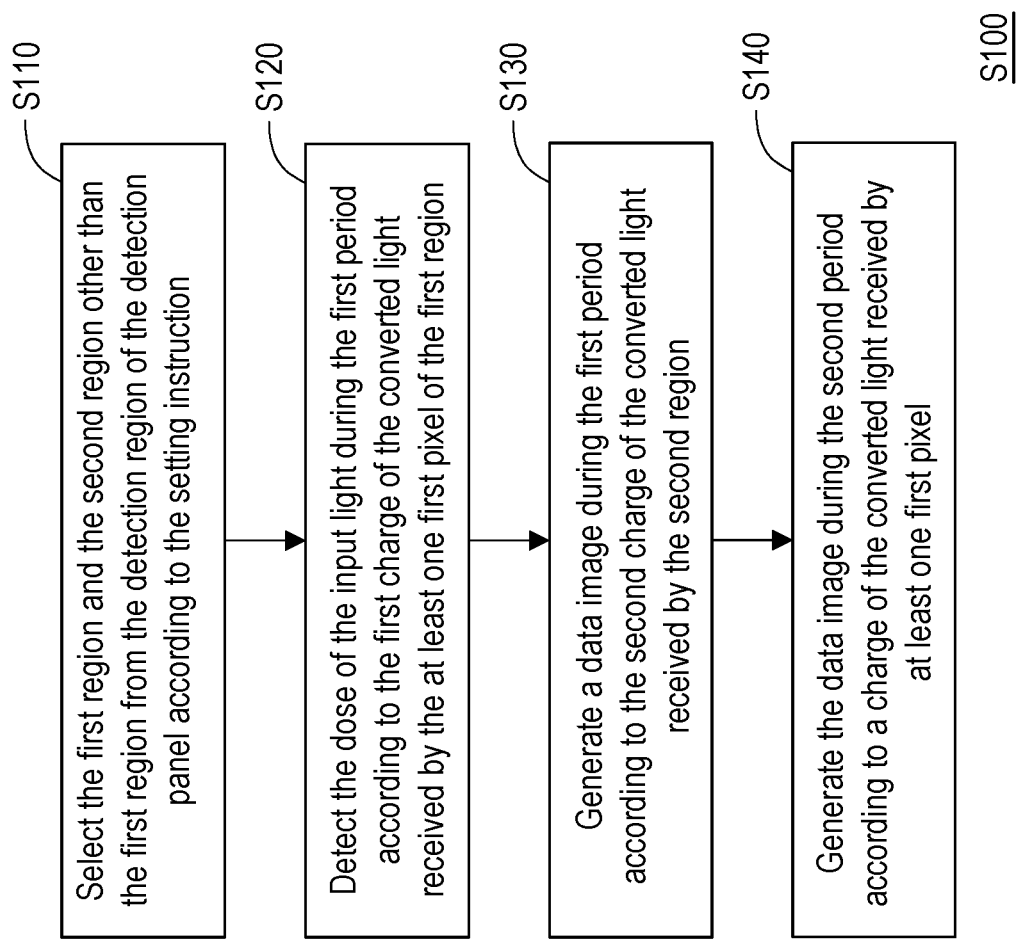
FIG. 3 is a flowchart of a detection method according to an embodiment of the disclosure.

FIG. 3 is a flowchart of a detection method according to an embodiment of the disclosure. Referring to FIG. 1 and FIG. 3 together, in this embodiment, the detection method S100 is adapted to the light detection device 100. In step S110, the light detection device 100 selects the first region R1 and the second region R2 other than the first region R1 from the detection region of the detection panel 110 according to the setting instruction SI. In step S120, the light detection device 100 detects the dose of the input light L1 during the first period according to the first charge C1 of the converted light L2 received by the first pixel P1 of the first region R1. In step S130, the light detection device 100 generates a data image during the first period according to the second charge C2 of the converted light L2 received by the second region R2. In step S140, the light detection device 100 generates the data image OIMG during the second period according to the charge of the converted light L2 received by the first pixel P1. The implementation details of steps S110~S140 may be sufficiently taught in the embodiment of FIG. 1 and FIG. 2, so it will not be repeated herein.

Figure 4:
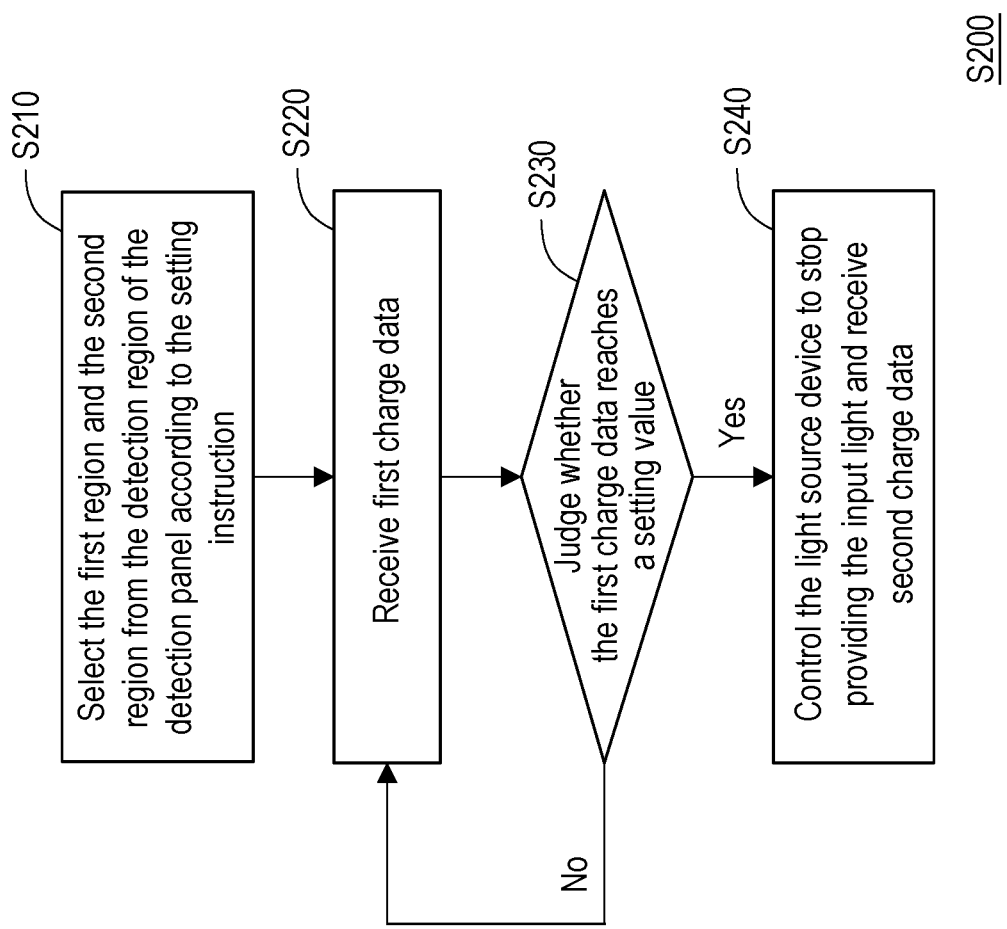
FIG. 4 is a flowchart of a detection method according to another embodiment of the disclosure.

FIG. 4 is a flowchart of a detection method according to another embodiment of the disclosure. Referring to FIG. 1 and FIG. 4 together, in this embodiment, the detection method S200 is adapted to the operation of the light detection device 100 during the first period. In step S210, the processor 120 selects the first region R1 and the second region R2 from the detection region of the detection panel 110 according to the setting instruction SI.

Figure 5:
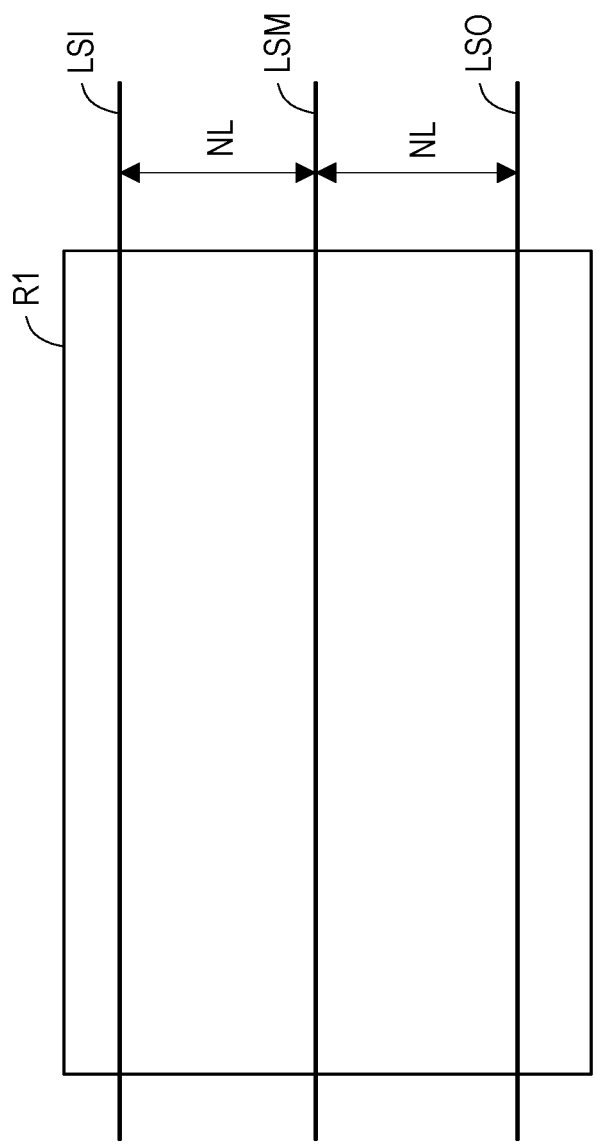
FIG. 5 is a schematic view of setting operation of a first region according to an embodiment of the disclosure.

To illustrate the implementation details of step S210 by examples, please refer to FIG. 1, FIG. 4, and FIG. 5 together. FIG. 5 is a schematic view of setting operation of a first region according to an embodiment of the disclosure. In this embodiment, during the first period, the setting instruction SI from external is provided. The processor 120 determines a number of setting scan line NL and an end scan line LSO according to the setting instruction SI. The processor 120 selects the first pixel P1 from the first region R1 according to the number of setting scan line NL and the end scan line LSO.

For example, the number of setting scan line NL is set equal to "150". The end scan line LSO is determined. Thus, in the first region R1, the end scan line LSO, a selected scan line LSI separated from the end scan line LSO by "300" rows, and a selected scan line LSM separated from the end scan line LSO by "150" rows are determined. For example, the end scan line LSO is equal to a scan line LS(a). The selected scan line LSI is a scan line LS(a-300). The selected scan line LSM is a scan line LS(a-150). In this embodiment, the number of setting scan line NL is a positive integer. Thus, the end scan line LSO and the selected scan line LSI and LSM are not adjacent to each other. In other words, the scan lines connected to the first pixel P1 are not adjacent to each other.

Next, the processor 120 uses the light detector connected to the end scan line LSO and the selected scan lines LSI and LSM in the first region R1 as the first pixel P1. In addition, the processor 120 uses the other light detectors in the first region R1 as the second pixels P2.

Figure 6:
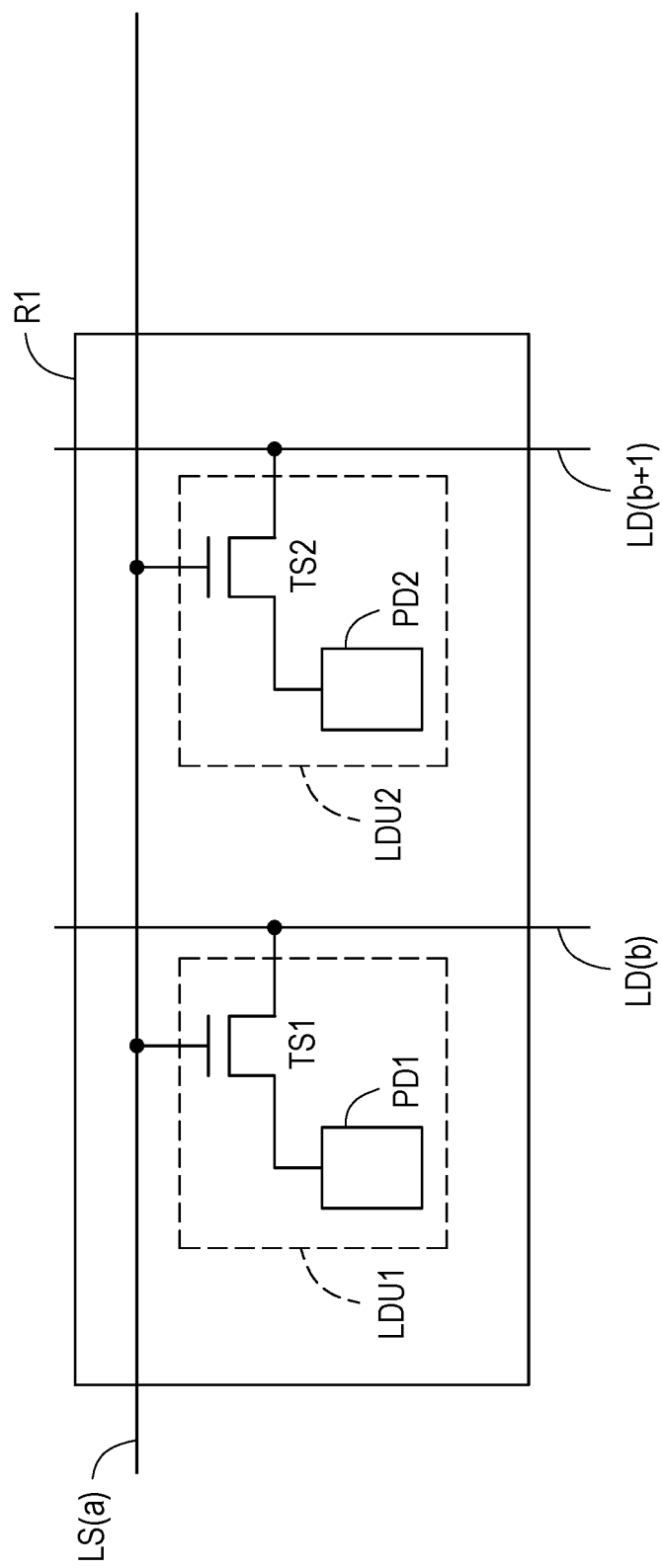
FIG. 6 is a schematic view of a first region according to an embodiment of the disclosure.

FIG. 6 is a schematic view of a first region according to an embodiment of the disclosure. Referring to FIG. 1, FIG. 4, and FIG. 6 together, in this embodiment, the first region R1 corresponds to the scan line LS(a) and data lines LD(b), LD(b+1). Thus, the processor 120 uses light detectors LDU1 and LDU2 in the first region R1 corresponding to the scan line LS(a) as the first pixel P1.

The light detector LDU1 includes a transistor TS1 and a photoelectric conversion element PD1. A first end of the transistor TS1 is coupled to the photoelectric conversion element PD1. A second end of the transistor TS1 is coupled to the data line LD(b). A control end of the transistor TS1 is coupled to the scan line LS(a). The light detector LDU2 includes a transistor TS2 and a photoelectric conversion element PD2. A first end of the transistor TS2 is coupled to the photoelectric conversion element PD2. A second end of the transistor TS2 is coupled to the data line LD(b+1). A control end of the transistor TS2 is coupled to the scan line LS(a).

The transistors TS1 and TS2 of this embodiment may be implemented by N-type MOSFETs, respectively. In some embodiments, the transistors TS1 and TS2 may be implemented by various types of transistors well known to those skilled in the art. The photoelectric conversion elements PD1 and PD2 of this embodiment are, for example, implemented by photodiodes, respectively.

Figure 7:
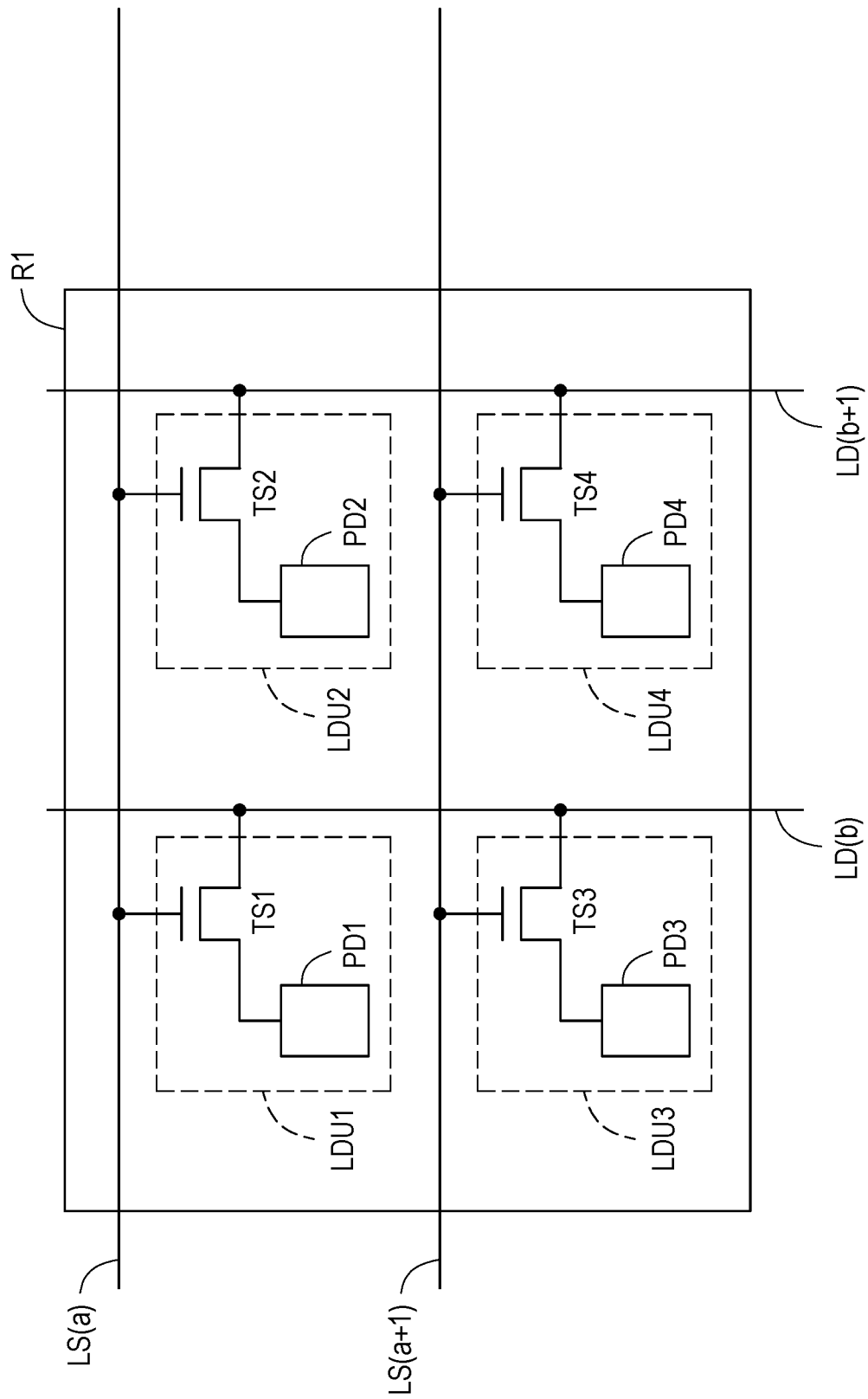
FIG. 7 is a schematic view of a first region according to another embodiment of the disclosure.

FIG. 7 is a schematic view of a first region according to another embodiment of the disclosure Referring to FIG. 1, FIG. 4, and FIG. 7 together, in this embodiment, the first region R1 corresponds to the scan lines LS(a) and LS(a+1) and data lines LD(b) and LD(b+1). Thus, the processor 120 uses the light detectors LDU1 and LDU2 in the first region R1 corresponding to the scan line LS(a) as the first pixel P1 and uses light detectors LDU3 and LDU4 in the first region R1 corresponding to the scan line LS(a+1) as the second pixel P2. The implementation of the light detectors LDU1 and LDU2 has been clearly described in the embodiment of FIG. 6, so it will not be repeated herein.

The light detector LDU3 includes a transistor TS3 and a photoelectric conversion element PD3. A first end of the transistor TS3 is coupled to the photoelectric conversion element PD3. A second end of the transistor TS3 is coupled to the data line LD(b). A control end of the transistor TS3 is coupled to the scan line LS(a+1). The light detector LDU4 includes a transistor TS4 and a photoelectric conversion element PD4. A first end of the transistor TS4 is coupled to the photoelectric conversion element PD4. A second end of the transistor TS4 is coupled to the data line LD(b+1). A control end of the transistor TS4 is coupled to the scan line (a+1).

The transistors TS1~TS4 of this embodiment may be implemented by N-type MOSFETs, respectively. In some embodiments, the transistors TS1~TS4 may be implemented by various types of transistors well known to those skilled in the art. The photoelectric conversion elements PD1~PD4 of this embodiment are, for example, implemented by photodiodes, respectively.

Returning to the embodiments of FIG. 1 and FIG. 4, in step S220, the processor 120 receives the first charge data DC1 and judges in step S230 whether the first charge data DC1 reaches a setting value SV. In response to the first charge data DC1 not reaching the setting value SV, it means that the dose of the input light L1 is insufficient. The dose of the input light L1 still needs to be accumulated. Thus, the processor 120 returns to the operation of step S220. On the other hand, in response to the first charge data DC1 reaching the setting value SV, it means that the dose of the input light L1 is sufficient. In step S240, the processor 120 controls the light source device LSD to stop providing the input light L1 and receive the second charge data DC2.

Figure 8:
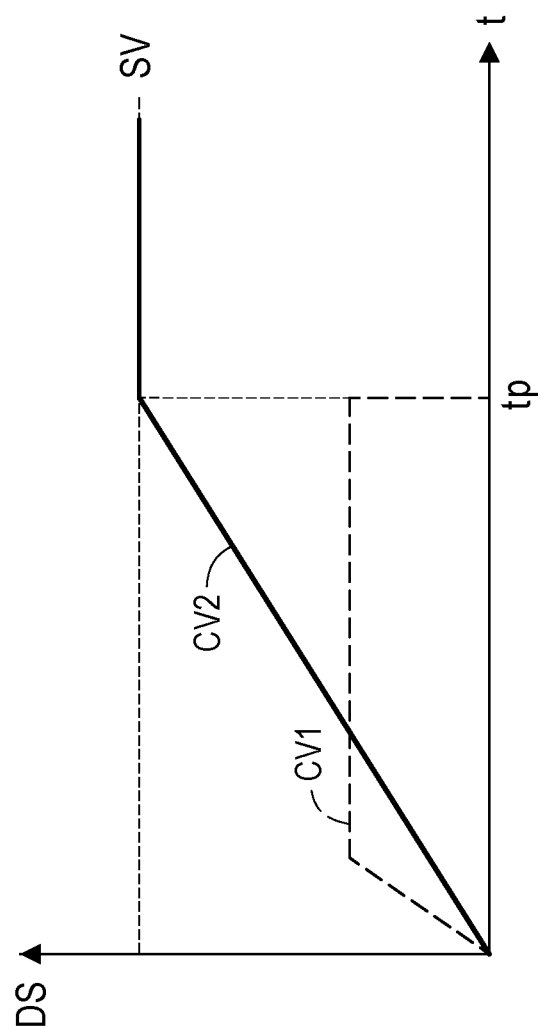
FIG. 8 is a time sequence diagram of a dose according to an embodiment of the disclosure.

The implementation details of steps S220~S240 are further described. FIG. 8 is a time sequence diagram of a dose according to an embodiment of the disclosure. Referring to FIG. 1, FIG. 4, and FIG. 8 together, the vertical axis of FIG. 8 is a dose value DS. The unit of the dose value DS is, for example, microGray (μGy). The horizontal axis of FIG. 8 is time t. The unit of time t is, for example, microsecond. FIG. 8 shows curves CV1 and CV2. The curve CV1 is a dose curve of the input light L1. The curve CV2 is a value of the first charge data DC1. The value of the first charge data DC1 is positively correlated with a cumulative result of the dose of the input light L1. During a period when the light source device LSD provides the input light L1, the first region R1 and the second region R2 of the detection panel 110 receive the converted light L2 corresponding to the input light L1. In step S220, the processor 120 controls the conversion circuit 130 and the driving circuit 140 so that the conversion circuit 130 reads the first charge C1 from the first data line corresponding to the first region R1. The conversion circuit 130 converts the first charge C1 into the first charge data DC1. Once the light source device LSD starts to provide the input light L1, the value of the first charge data DC1 continues to be accumulated. In response to the first charge data DC1 being lower than the setting value SV, the processor 120 continues to receive the first charge data DC1 to judge the value of the first charge data DC1. During the period when the light source device LSD provides the input light L1, the value of the first charge data DC1 continues to increase.

In response to the first charge data DC1 reaching the setting value SV, in step S240, the processor 120 provides a control signal SAEC to control the light source device LSD to stop providing the input light L1 at a time point tp. Thus, after the time point tp, the first charge data DC1 is not increased. In addition, the processor 120 controls the conversion circuit 130 and the driving circuit 140 so that the conversion circuit 130 reads the second charge C2 from the second data line corresponding to the second region R2 and the data line corresponding to the second pixel P2. The conversion circuit 130 converts the second charge C2 into the second charge data DC2.

Returning to the embodiments of FIG. 1 and FIG. 4, in step S240, the processor 120 further builds the data image OIMG according to the second charge data DC2.

It should be noted that during the first period, the first charge data DC1 is used to detect the dose of the input light L1. The data image OIMG does not include the first charge data DC1. A portion of image corresponding to the first pixel P1 in the data image OIMG may have a discontinuous visual result. Thus, in response to the first charge data DC1 reaching the setting value SV, the processor 120 builds the data image OIMG according to the second charge data DC2 and compensates the charge data corresponding to the first pixel P1 in the data image OIMG.

As mentioned above, the scan lines connected to the first pixel P1 are not adjacent to each other. The second pixel P2 is adjacent to the first pixel P1. Thus, the processor 120 may use the second charge data DC2 of the second pixel P2 to compensate the charge data corresponding to the first pixel P1. The processor 120 may also use the second charge data DC2 adjacent to the first pixel P1 in the second region R2 to compensate the charge data corresponding to the first pixel P1. In this way, the visual discontinuity of a portion of the image corresponding to the first pixel P1 in the data image OIMG may be reduced.

Figure 9:
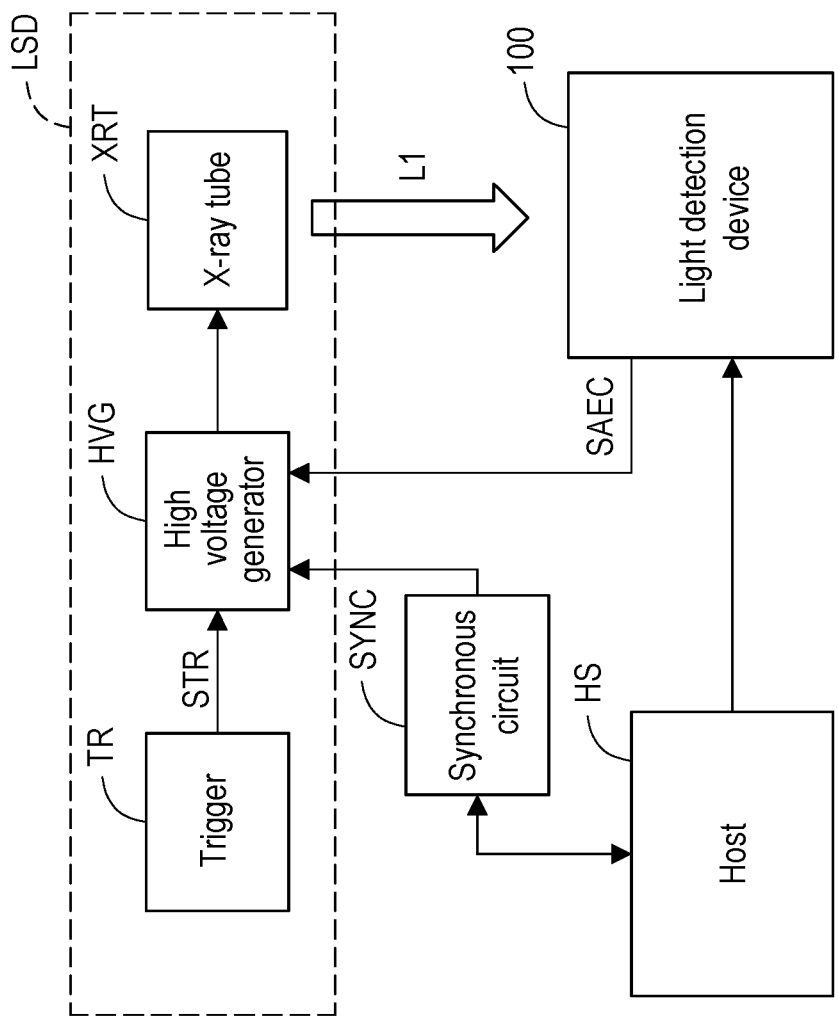
FIG. 9 is a system schematic view according to the second embodiment of the disclosure.
Figure 10:
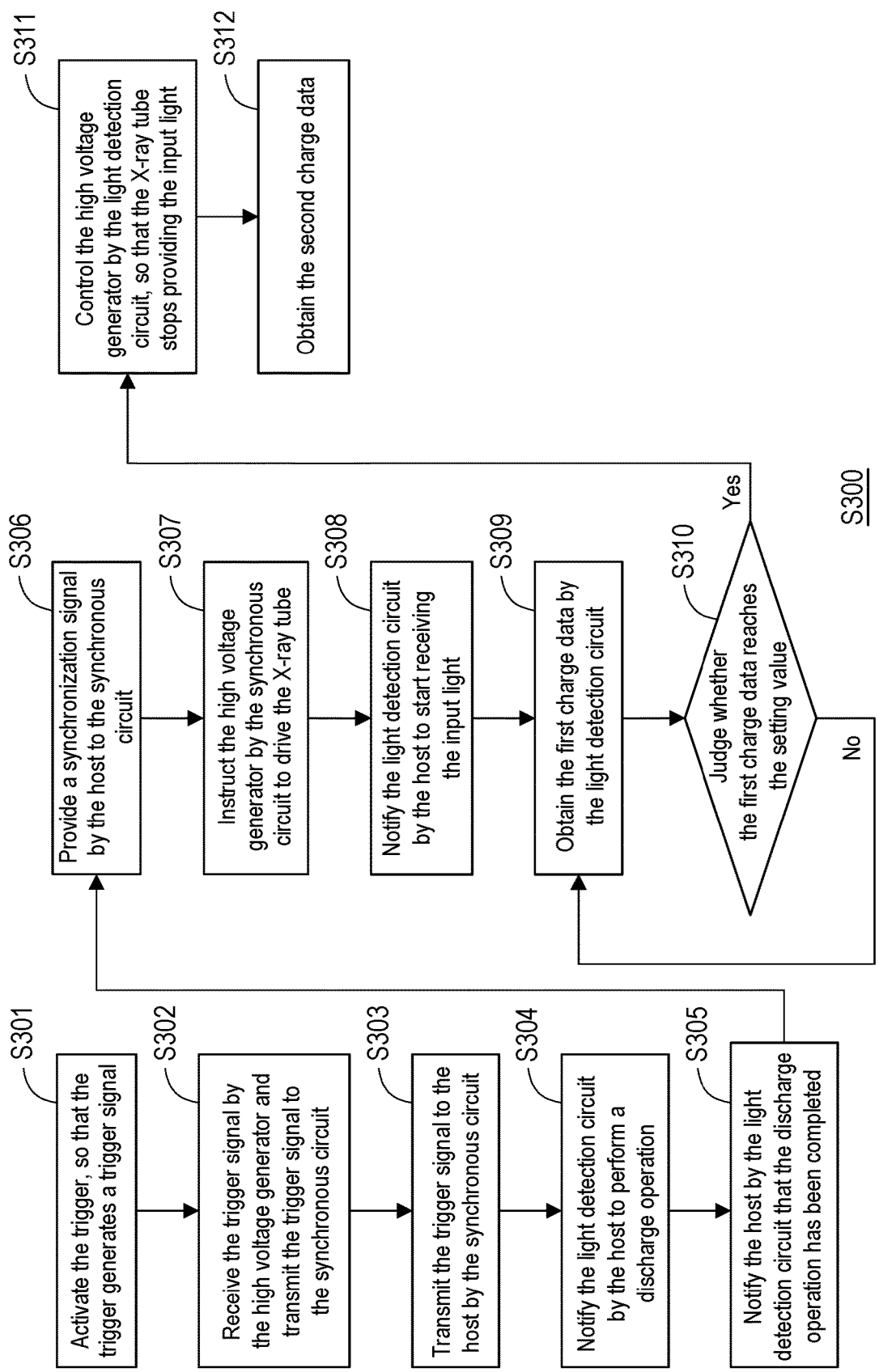
FIG. 10 is a flowchart of the operating procedures shown in FIG. 9.

FIG. 9 is a system schematic view according to the second embodiment of the disclosure. FIG. 10 is a flowchart of the operating procedures shown in FIG. 9. Referring to FIG. 9 and FIG. together, in this embodiment, a system 20 includes a light source device LSD, a light detection device 100, a host HS, and a synchronous circuit SYNC. The system 20 is a synchronization system. The light source device LSD includes a trigger TR, a high voltage generator HVG, and an X-ray tube XRT. The light detection device 100 may be used in the system 20. The implementation details of the light detection device 100 have been clearly described in the embodiments of FIG. 1 to FIG. 8, so they will not be repeated herein.

An operating procedure S300 is adapted to the system 20. The operating procedure S300 includes steps S301~S312. The trigger TR is activated in step S301. Thus, the trigger TR generates a trigger signal STR. In step S302, the high voltage generator HVG receives the trigger signal STR and transmits the trigger signal STR to the synchronous circuit SYNC. In step S303, the synchronous circuit SYNC transmits the trigger signal STR to the host HS. Thus, in step S304, the host HS may notify the light detection circuit 100 to perform a discharge operation according to the trigger signal STR. The light detection circuit 100 discharges the charge in the detection panel. Once the discharge operation is completed, in step S305, the light detection circuit 100 notifies the host HS that the discharge operation has been completed.

Next, in step S306, the host HS provides a synchronization signal to the synchronous circuit SYNC. In step S307, the synchronous circuit SYNC instructs the high voltage generator HVG to drive the X-ray tube XRT in response to the synchronous circuit SYNC. In step S307, The X-ray tube XRT provides the input light L1. In step S308, the host HS notifies the light detection circuit 100 to start receiving the input light L1.

In step S309, the light detection circuit 100 obtains the first charge data (i.e., the first charge data DC1 shown in FIG. 1) according to the input light L1. The light detection circuit 100 may obtain the first charge data through the conversion circuit 130 shown in FIG. 1 or a corresponding algorithm. In step S310, the light detection circuit 100 judges whether the first charge data reaches the setting value. In response to the first charge data not reaching the setting value, it means that the dose of the input light L1 is insufficient. The dose of the input light L1 still needs to be accumulated. Thus, the light detection circuit 100 returns to the operation of step S309. On the other hand, in response to the first charge data reaching the setting value, it means that the dose of the input light L1 is sufficient. In step S311, the light detection circuit 100 controls the high voltage generator HVG, so that the X-ray tube XRT stops providing the input light L1. In step S311, the light detection circuit 100 provides the control signal SAEC. The high voltage generator HVG responds to the control signal SAEC to stop the light source device LSD from providing the input light L1.

In step S312, the light detection circuit 100 obtains the second charge data (i.e., the second charge data DC2 shown in FIG. 1). The light detection circuit 100 may obtain the second charge data through the conversion circuit 130 shown in FIG. 1 or a corresponding algorithm.

In this embodiment, the detailed implementation of steps S308-S312 has been clearly described in the embodiments of FIG. 4 to FIG. 8, so it will not be repeated herein.

In addition, the light detection circuit 100 further builds the data image OIMG based on the second charge data.

Figure 11:
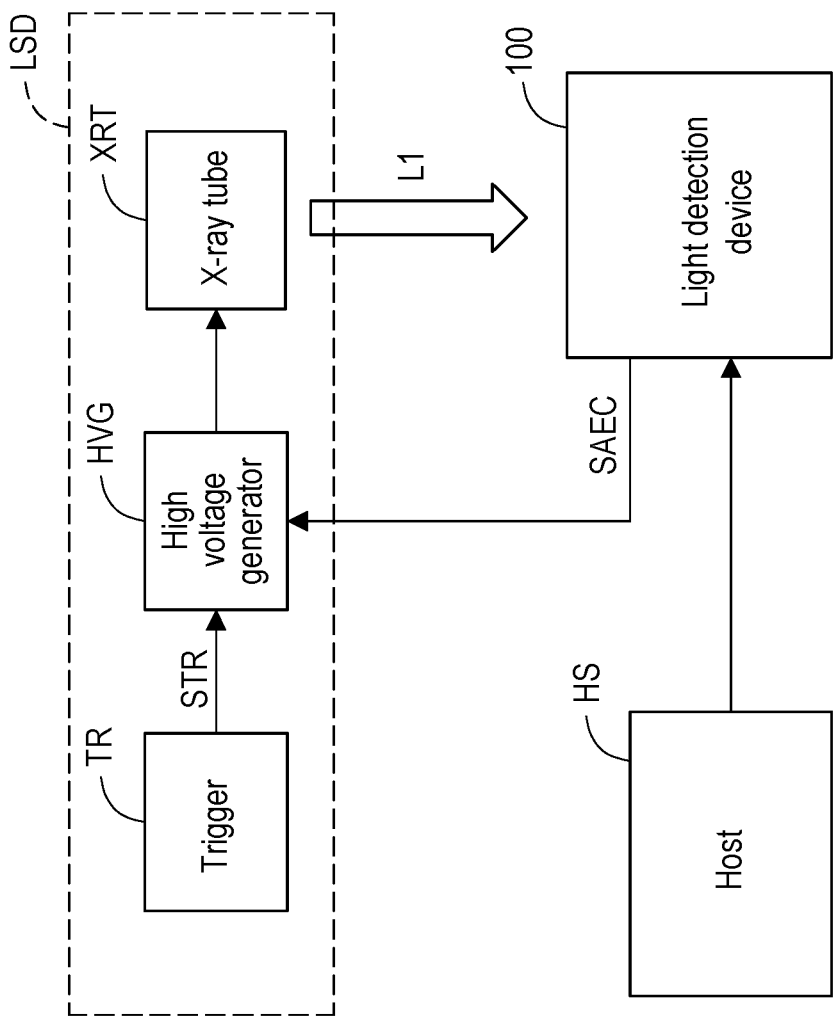
FIG. 11 is a system schematic view according to the third embodiment of the disclosure.
Figure 12:
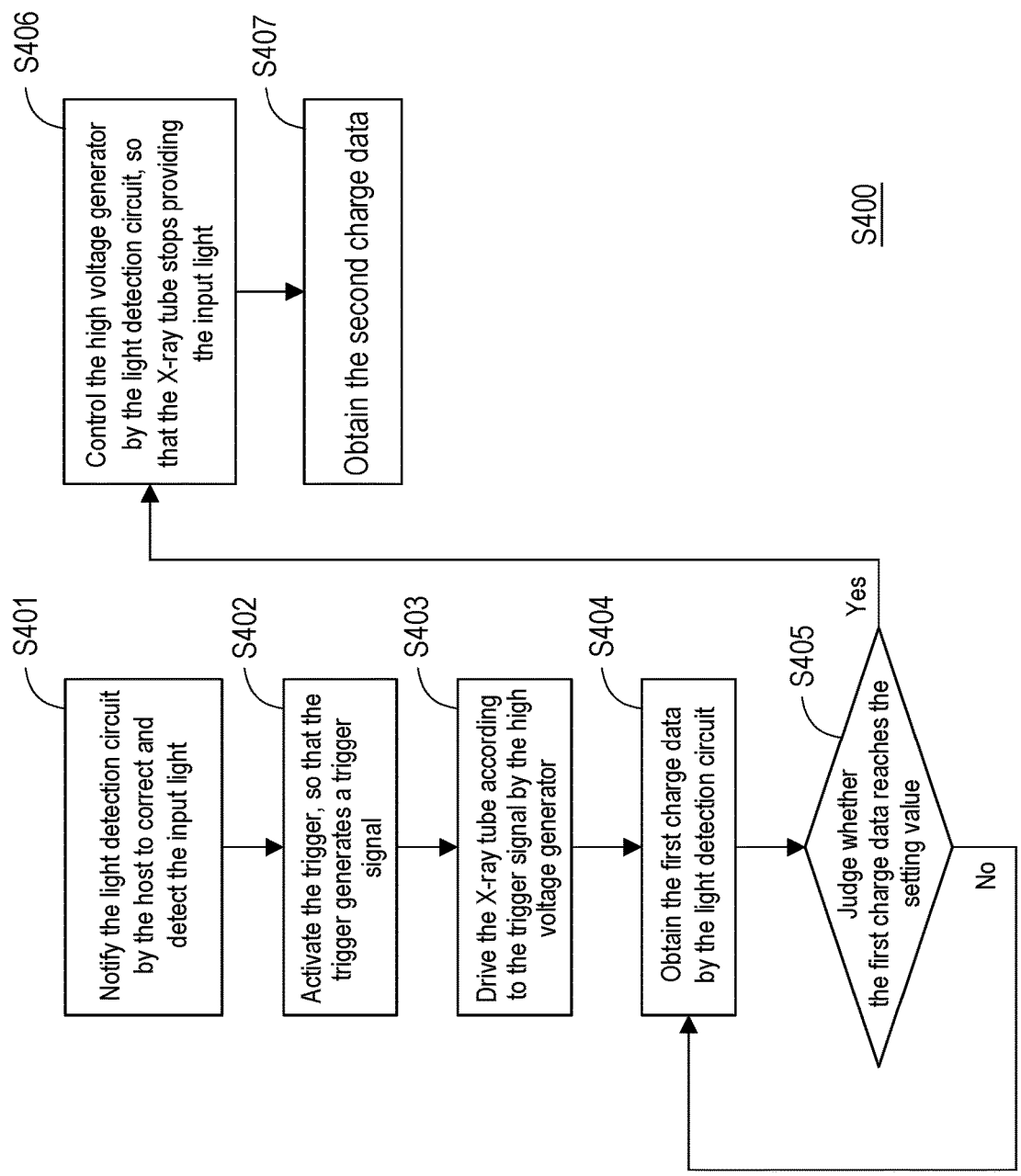
FIG. 12 is a flowchart of the operating procedures shown in FIG. 11.

FIG. 11 is a system schematic view according to the third embodiment of the disclosure. FIG. 12 is a flowchart of the operating procedures shown in FIG. 11. Referring to FIG. 11 and FIG. 12 together, in this embodiment, the system 30 includes the light source device LSD, the light detection device 100, and the host HS. The system 30 is an aynchronization system. The light source device LSD includes a trigger TR, a high voltage generator HVG, and an X-ray tube XRT. The light detection device 100 may be used in the system 30. The implementation details of the light detection device 100 have been clearly described in the embodiments of FIG. 1 to FIG. 8, so they will not be repeated herein.

An operating procedure S400 is adapted to the system 30. The operating procedure S400 includes steps S401~S407. In step S401, the host HS notifies the light detection circuit 100 to correct and detect the input light L1. In this embodiment, "correction" includes the discharge operation of the light detection circuit 100 on the charge in the detection panel. In step S402, the trigger TR is activated. Thus, the trigger TR generates a trigger signal STR. In step S403, the high voltage generator HVG receives the trigger signal STR and drives the X-ray tube XRT according to the trigger signal STR.

In step S404, the light detection circuit 100 obtains the first charge data (i.e., the first charge data DC1 shown in FIG. 1) according to the input light L1. In step S405, the light detection circuit 100 judges whether the first charge data reaches the setting value. In response to the first charge data not reaching the setting value, the light detection circuit 100 returns to the operation of step S404. On the other hand, in response to the first charge data reaching the setting value, in step S406, the light detection circuit 100 controls the high voltage generator HVG, so that the X-ray tube XRT stops providing the input light L1. In step S407, the light detection circuit 100 obtains the second charge data. In addition, the light detection circuit 100 further builds the data image OIMG based on the second charge data.

In this embodiment, the detailed implementation of steps S404-S407 has been clearly described in the embodiments of FIG. 4 to FIG. 8, so it will not be repeated herein.

To sum up, the light detection device selects the first region and the second region of the detection panel according to the setting instruction. During the first period, the light detection device detects the dose of the input light according to a first charge from the first pixel of the first region and generates a data image according to the second charge from the second region. During the second period, the light detection device generates the data image according to a charge received by the first pixel. In this way, the light detection device may have the function of detecting the exposure dose without equipping an additional sensor. In addition, the processor further builds the data image according to the second charge data and compensates the charge data corresponding to the first pixel. In this way, the visual discontinuity of a portion of the image corresponding to the first pixel in the data image may be reduced.

Although the disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and their equivalents and not by the above detailed descriptions.

What is claimed is:

1. A light detection device for controlling a light source device, comprising:
    a detection panel, configured to convert an input light from the light source device into a converted light and convert the converted light into a charge; and
    a processor, coupled to the detection panel and the light source device and configured to select a first region and a second region other than the first region from a detection region of the detection panel according to a setting instruction,
    wherein a first charge of the converted light received by at least one first pixel of the first region during a first period is used to detect a dose of the input light,
    wherein a second charge of the converted light received by the second region during the first period is used to generate a data image,
    wherein the charge of the converted light received by the at least one first pixel during a second period is used to generate the data image.

2. The light detection device according to claim 1, further comprising:
    a conversion circuit, coupled to the processor and the detection panel and configured to convert the first charge of the at least one first pixel from the first region into first charge data and convert the second charge from the second region into second charge data during the first period.

3. The light detection device according to claim 2, wherein during the first period, the processor judges whether the first charge data reaches a setting value during a period when the light source device provides the input light and, in response to the first charge data reaching the setting value, controls the light source device to stop providing the input light and receive the second charge data through the conversion circuit.

4. The light detection device according to claim 2, wherein:
    the detection panel comprises a plurality of light detectors, a plurality of scan lines, and a plurality of data lines,
    the light detectors are correspondingly connected to the scan lines and the data lines,
    the conversion circuit is coupled to the processor and the data lines, and
    the light detection device further comprises:
        a driving circuit, coupled to the processor and the scan lines.

5. The light detection device according to claim 4, wherein during the first period:
    the first region comprises at least one first light detector among the light detectors,
    the driving circuit determines at least one first scan line corresponding to the first region according to the first region, and
    the conversion circuit determines at least one first data line corresponding to the first region according to the first region.

6. The light detection device according to claim 5, wherein:
    during a period when the light source device provides the input light, the conversion circuit reads the first charge from the at least one first data line and converts the first charge into the first charge data, and
    in response to the first charge data reaching a setting value, the conversion circuit reads the second charge from at least one second data line and converts the second charge into the second charge data.

7. The light detection device according to claim 1, wherein in response to first charge data reaching a setting value, the processor builds the data image according to second charge data and compensates charge data corresponding to the at least one first pixel.

8. The light detection device according to claim 1, wherein at least one second pixel other than the at least one first pixel of the first region and the second charge of the converted light received by the second region during the first period are used to generate a data image.

9. The light detection device according to claim 1, wherein the processor determines a number of setting scan line and an end scan line according to the setting instruction during the first period and selects the at least one first pixel from the first region according to the number of setting scan line and the end scan line.

10. The light detection device according to claim 1, wherein:
    the input light is an x-ray, and
    the converted light is a visible light.

11. A detection method for controlling a light detection device of a light source device, wherein the light detection device comprises a detection panel, wherein the detection panel converts an input light from the light source device into a converted light, and wherein the detection method comprises:
    selecting a first region and a second region other than the first region from a detection region of the detection panel according to a setting instruction;
    detecting a dose of the input light during a first period according to a first charge of the converted light received by at least one first pixel of the first region;
    generating a data image during the first period according to a second charge of the converted light received by the second region; and
    generating the data image during a second period according to a charge of the converted light received by the at least one first pixel.

12. The detection method according to claim 11, wherein detecting the dose of the input light according to the first charge of the converted light received by the at least one first pixel of the first region comprises:

converting the first charge of the at least one first pixel from the first region into first charge data and the second charge from the second region into second charge data during the first period.

13. The detection method according to claim 12, further comprising:
  judging whether the first charge data reaches a setting value during a period when the light source device provides the input light during the first period and, in response to the first charge data reaching the setting value, controlling the light source device to stop providing the input light and receive the second charge data through a conversion circuit.

14. The detection method according to claim 12, wherein the detection panel comprises a plurality of light detectors, a plurality of scan lines, and a plurality of data lines, and
  the light detectors are correspondingly connected to the scan lines and the data lines.

15. The detection method according to claim 14, wherein during the first period, the first region comprises at least one first light detector among the light detectors, and wherein the detection method further comprises:
  determining at least one first scan line corresponding to the first region according to the first region; and
  determining at least one first data line corresponding to the first region according to the first region.

16. The detection method according to claim 15, wherein detecting the dose of the input light according to the first charge of the converted light received by the at least one first pixel of the first region comprises:
  reading the first charge from the at least one first data line and converting the first charge into the first charge data during a period when the light source device provides the input light.

17. The detection method according to claim 16, wherein generating the data image according to the second charge of the converted light received by the second region comprises:
  reading the second charge from at least one second data line and converting the second charge into the second charge data in response to the first charge data reaching a setting value.

18. The detection method according to claim 11, further comprising:
  building the data image according to second charge data and compensating charge data corresponding to the at least one first pixel in response to first charge data reaching a setting value.

19. The detection method according to claim 11, wherein at least one second pixel other than the at least one first pixel of the first region and the second charge of the converted light received by the second region during the first period are used to generate a data image.

20. The detection method according to claim 11, wherein selecting the first region and the second region other than the first region from the detection region of the detection panel according to the setting instruction comprises:
  determining a number of setting scan line and an end scan line according to the setting instruction; and
  selecting the at least one first pixel from the first region according to the number of setting scan line and the end scan line.

* * * * *